United States Patent
Walston et al.

(10) Patent No.: US 8,509,256 B1
(45) Date of Patent: Aug. 13, 2013

(54) POWER SAVING FOR INTERNET-TELEPHONY BROADBAND DEVICES

(75) Inventors: Robert Allen Walston, Sandy Springs, GA (US); Carol J. Ansley, Johns Creek, GA (US); Mark Lynch, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 304 days.

(21) Appl. No.: 12/911,484

(22) Filed: Oct. 25, 2010

Related U.S. Application Data

(60) Provisional application No. 61/324,465, filed on Apr. 15, 2010, provisional application No. 61/325,004, filed on Apr. 16, 2010.

(51) Int. Cl.
*H04L 12/56* (2006.01)
*H04J 1/16* (2006.01)

(52) U.S. Cl.
USPC .................. 370/419; 370/252; 370/463

(58) Field of Classification Search
USPC ................................ 370/252, 419, 463
See application file for complete search history.

(56) References Cited

U.S. PATENT DOCUMENTS

| | | | | |
|---|---|---|---|---|
| 4,860,185 A | * | 8/1989 | Brewer et al. | 363/41 |
| 6,601,181 B1 | * | 7/2003 | Thomas | 713/340 |
| 2010/0180139 A1 | * | 7/2010 | Denney et al. | 713/330 |

* cited by examiner

*Primary Examiner* — John Pezzlo
(74) *Attorney, Agent, or Firm* — Troy A. Van Aacken; Robert J. Starr

(57) ABSTRACT

Systems and methods can be used to reduce power consumption on a device. In some implementations, power consumption can be reduced by powering down modules. In other implementations, power consumption can be reduced by communicating configuration status messages to the terminating system to reduce communications. Power saving can extend backup battery power duration thereby affording users to access telephone services during a power outage.

22 Claims, 6 Drawing Sheets

POWER SAVING FOR INTERNET-TELEPHONY BROADBAND DEVICES

RELATED APPLICATIONS

This application is a non-provisional application claiming priority to, and the benefit of, U.S. Provisional Application, Ser. No. 61/324,465, entitled, "Self Directed Power Saving for Network Devices," filed Apr. 15, 2010, and claims priority as a non-provisional application of U.S. Provisional Application Ser. No. 61/325,004, entitled "Power Saving Methods and Apparatuses for Network Devices," filed Apr. 16, 2010, both of which are hereby incorporated by reference in their entirety.

TECHNICAL FIELD

This disclosure relates to power saving for internet-telephony broadband devices.

BACKGROUND

Broadband services can be delivered via existing cable infrastructure from MSOs, digital subscriber lines (xDSL), public switched telephone networks, integrated service digital network (ISDN), or T1 connections from telecommunications operators or internet service providers, satellite from satellite operators, or wireless services (such as, e.g., cellular, 802.11 or Wi-MAX standards) from wireless service providers, among many others.

Subscribers can typically access multiple broadband communications devices or a single integrated device at their location to provide such varied services. Such device can transmit information to and receive information from other networked devices such as, for example, terminating systems. Examples of such broadband devices include cable modems (CM), multimedia terminal adapters (MTA), digital subscriber line (DSL) modems, wireless modems, and set-top boxes (STB), among others. Examples of terminating systems include cable modem termination systems (CMTS), edge quadrature amplitude modulation (Edge-QAM) devices, digital subscriber line access multiplexers (DSLAM), satellite devices, and wireless cellular towers, among others.

Broadband devices use various broadband protocols to deliver telecommunications services such as, for example, video, telephony, and high-speed Internet data to users over network infrastructure. Each of the varied broadband protocols encompasses a concept of transmission from the user to the terminating system and transmission from the terminating system to the user. For example, in cable broadband infrastructure, the transmission from the CM to the CMTS is called an upstream transmission. Conversely, transmission from the CMTS to the CM is called a downstream transmission.

Among the most common services are high-speed internet data to replace traditional dial-up, digital video to replace traditional broadcast television (e.g., over-the-air (OTA)), and voice over internet protocol (VoIP) telephony to replace traditional private branch exchange (PBX) telephony. The addition of VoIP telephony services is facilitated by increased, reliable uptime in case primary power to the broadband device is lost and the user would like to place a telephone call. Accordingly, many broadband devices are equipped with an additional backup battery source for use in case traditional power is temporarily lost. However, broadband devices can require a significant amount of power as functions and data rates increase thereby reducing the life of the backup battery and limiting the use of telephony services.

BRIEF DESCRIPTION OF THE DRAWINGS

Like reference numbers and designations in the various drawings indicate like elements.

DETAILED DESCRIPTION

In some implementations of this disclosure, systems and methods can operate to detect an external power failure and perform a power down of module components to conserve backup battery power. In some implementations, the broadband device can operate to identify an external power failure. When an external power failure has occurred, the broadband device can alert the terminating system and instruct modules to power down, thus reducing device power drain, reducing the likelihood of a service outage, and preserving a longer duration to make telephone calls. Subsequently, the broadband device can monitor status and instruct modules and terminating system(s) to return to normal mode once external power has been restored. It should be understood that module can refer to modules that are used to place phone calls with the broadband device.

Systems and methods of this disclosure can also operate to provide a mechanism for power saving for broadband devices using status messages to limit communication with the terminating system. In some implementations, the broadband device can transmit messages to the terminating system to increase hold-off time for communication. In other implementations, the broadband device can ignore information received from external devices such as, for example, a terminating system.

Subsequently, the broadband device can regularly monitor if external power has been restored. If external power has been restored, the broadband device can instruct some or all modules previously powered down to resume normal operation. Moreover, the broadband device can alert the terminating system that primary power has been restored. It should be understood that the power saving methods can be encapsulated in one or more functional modules within the broadband device and/or the terminating system and initiated by one or more networked devices.

Figure 1:
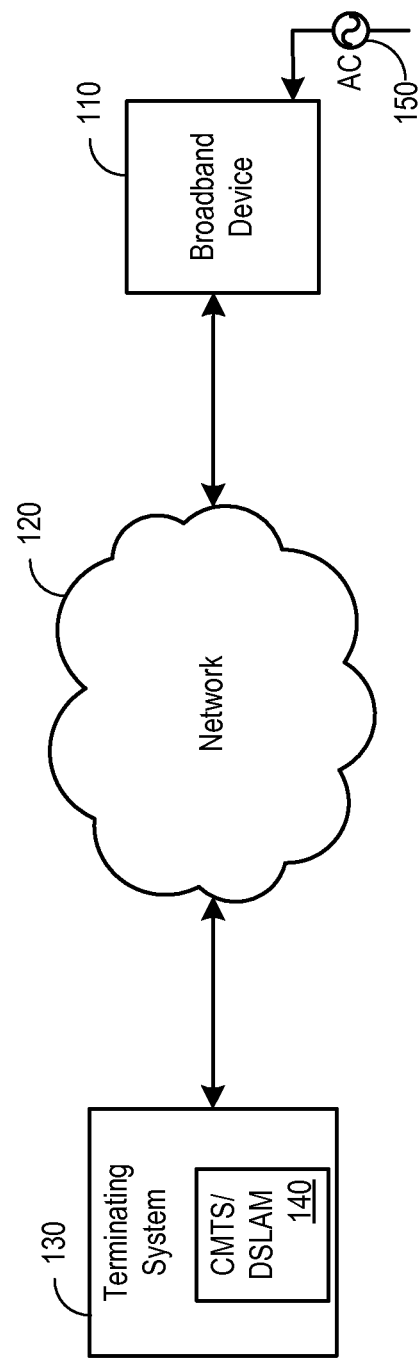
FIG. 1 is a block diagram illustrating an example network environment operable to provide power saving for internet-telephony broadband devices.

FIG. 1 is a block diagram illustrating an example network environment operable to provide power saving for internet-telephony broadband devices. In some implementations, an end user's broadband device 110 can be provided video, data and/or voice service(s) over a network 120 from a terminating system 130. The broadband device 110 can be a networked device such as, for example, a cable modem (CM), multimedia terminal adapter (MTA), digital subscriber line (DSL) modem, wireless modem, set-top box (STB), among others. Moreover, the broadband device 110 can be connected to an external power source 150.

In some implementations, the network 120 can be a hybrid-fiber coax network that uses existing cable infrastructure to provide broadband services. In other implementations, the network 120 can be a digital subscriber line (DSL) network and the broadband device 110 can be a DSL modem. In still further implementations, the network 120 can be a wireless network and the broadband device 110 can be a wireless modem or cellular phone.

In some implementations, the terminating system 130 can include a cable modem termination system (CMTS) 140 or digital subscriber line access multiplexer (DSLAM) 140. In other implementations, the terminating system 130 can include a wireless access point and/or cellular phone tower. Terminating systems 130 can connect to external network(s) to provide access to the Internet, telephony systems, television broadcasts, among others.

The broadband device 110 can communicate with other networked devices with a variety of physical and network protocols. The broadband device can be powered by external power via an AC outlet 150 and an internal battery for backup in the case of an external power 150 failure. In other implementations, a primary battery can be used in lieu of an external power 150 source. In data over cable services, data traffic transferred from the terminating system 130 to the broadband device 110 is said to travel in a downstream direction on a downstream channel; conversely, traffic transferred from the broadband device 110 to the terminating system 130 is said to travel in an upstream direction on an upstream channel.

For a user that receives telephone service via a broadband device 110, it is important that the user still have telephone service in case of emergencies when A/C power 150 is interrupted and the broadband device 110 no longer receives power. Many multiple service operators (MSOs) require that when a broadband device 110 is used to provide telephone services, components such as a backup battery be added to the broadband device. Backup battery can be used for some period after a loss of A/C power 150.

During operation, the broadband device 110 identifies a valid primary downstream channel. The acquisition of a downstream channel can be based on one or more of the last operational channels stored in non-volatile storage, or by scanning the channels of the downstream frequency band of operation until the broadband device 110 identifies a valid primary downstream signal. Once the broadband device 110 identifies a primary downstream channel, the broadband device 110 can receive broadcast information from the terminating system 130 to identify a set of downstream channels that are available to the broadband device 110 and to identify upstream channels that might be available to the broadband device 110.

The broadband device 110 can then attempt to continue the initialization process to gain access to the upstream physical layer by sending a message on a selected upstream channel. If the attempt to initialize on the selected upstream channel is unsuccessful, the broadband device 110 can attempt to initialize the upstream physical layer on alternative channel selections until the broadband device 110 succeeds in contacting the terminating system 130. Success in contacting the terminating system 130 can be identified, for example, as receiving a response from the terminating system 130. The upstream channel on which the broadband device 110 successfully contacts the terminating system 130 during initialization can be referred to as the primary upstream channel.

Initialization of the broadband device 110 can also include, for example, among others: communicating with a dynamic host control protocol (DHCP) server to obtain an IP address and a trivial file transfer protocol (TFTP) server to obtain a configuration file, registering with the terminating system 130 using the configuration file, and using a baseline privacy interface (BPI) to setup encryption/security. When initialization is complete, two way communications via the primary downstream channel and the primary upstream channel is established between the terminating system 130 and broadband device 110.

It should be understood that, in addition to data over cable services, the principles described are also applicable other types of networks such as, for example, digital subscriber lines (xDSL), public switched telephone networks, integrated service digital network (ISDN), or T1 connections from telecommunications operators or internet service providers, satellite from satellite operators, or wireless services (such as, e.g., cellular, 802.11 or Wi-MAX standards) from wireless service providers, among many others.

Figure 2:
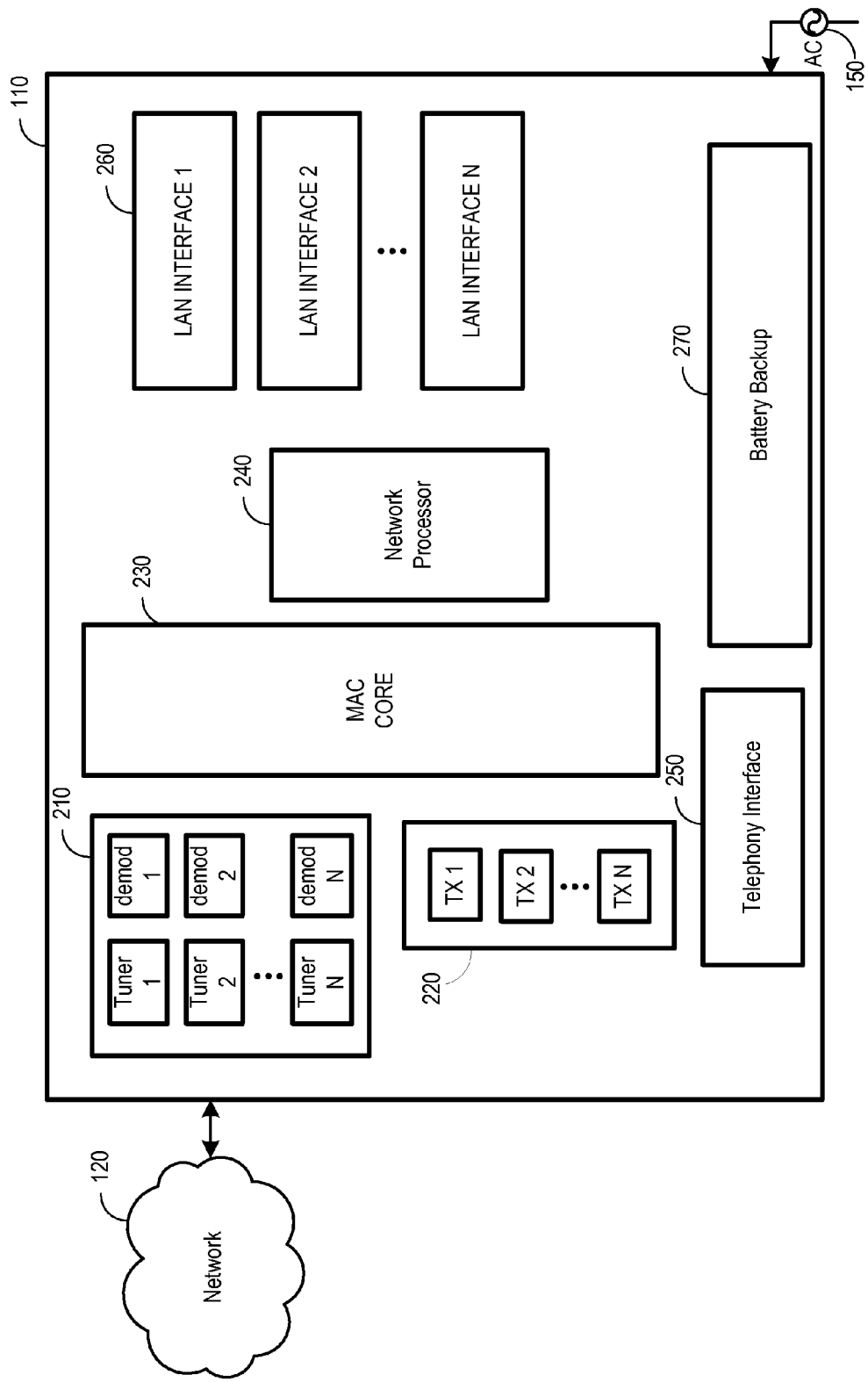
FIG. 2 is a block diagram illustrating an example data over cable broadband device operable to provide power saving for internet-telephony broadband devices.

FIG. 2 is a block diagram illustrating an example data over cable broadband device operable to provide power saving for internet-telephony broadband devices. The broadband device 110 can include RF downstream circuitry 210 that includes multiple tuners and corresponding demodulators to receive traffic on multiple downstream channels. The tuners can be single channel tuners, multiple channel wideband tuners, or a combination of the foregoing. The demodulators may be on the same chip as the tuners or on a separate chip. A data over cable broadband device 110 can use multiple tuners and demodulators and/or specialized tuner technologies to receive the downstream packets transmitted over the downstream channels.

The broadband device 110 also can include multiple transmitters 220. Multiple transmitters can be used to facilitate transmission of traffic on multiple upstream channels, a media access control (MAC) core processer 230, a network processor 240, a telephony interface 250 for telephone service; and LAN interfaces 260 such as an Ethernet, Wi-Fi, USB, or any other LAN interface that connects to user devices. Upstream and downstream channels connect via an interface to the network 120 and can be used by the broadband device 110 to communicate with the terminating system (e.g., terminating system 130 of FIG. 1). Many user devices can connect to the broadband device's 110 LAN interfaces 260. The broadband device 110 also may include a battery backup 270 and a connection to external AC power 150.

Figure 3:
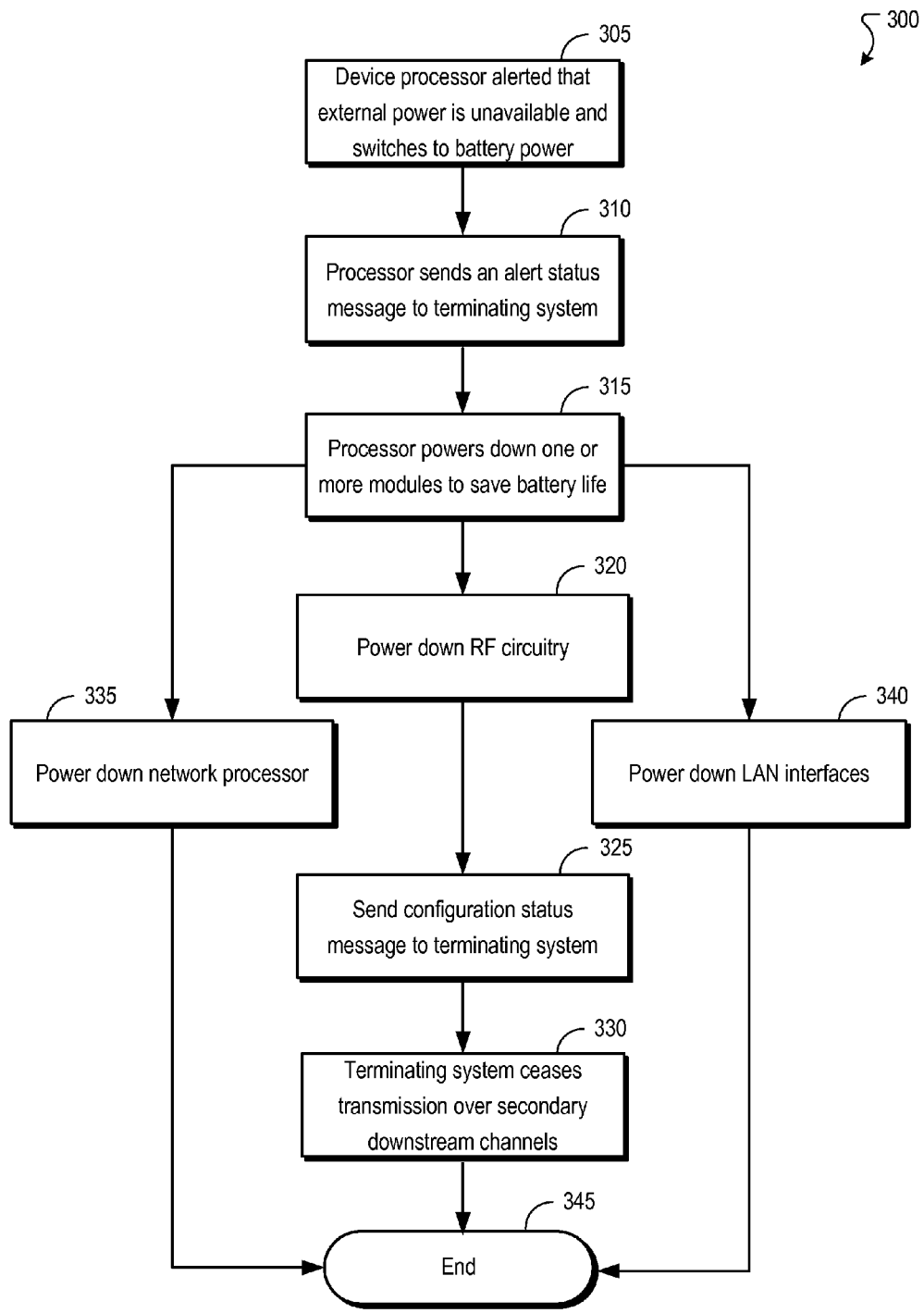
FIG. 3 is a flowchart illustrating an example broadband device process operable to provide power saving for internet-telephony broadband devices using module power down.

FIG. 3 is a flowchart illustrating an example broadband device process operable to provide power saving for internet-telephony broadband devices using module power down. The process begins at stage 305, when the broadband device processor is alerted that external power is unavailable and switches to backup battery power. The alert can be made by the broadband device (e.g., broadband device 110 of FIG. 1) module processor inside, for example, the MAC core (e.g., MAC core 230 of FIG. 2). In other implementations, the alert can be a processor interrupt. It should be understood that module can include those modules that are not used to place phone calls with the broadband device.

At stage 310, the broadband device processor sends an alert status message to the terminating system. The broadband device (e.g., broadband device 110 of FIG. 1) can send the alert via a status message to the terminating system (e.g., terminating system 130 of FIG. 1). In other implementations, the terminating system is actively monitoring status of the broadband device.

At stage 315, the broadband device processor powers down one or more modules to conserve battery life. The module power down is performed by the broadband device (e.g., broadband device 110 of FIG. 1) and/or the terminating system (e.g., terminating system 130 of FIG. 1). The module power down can perform one or more of the processes at stage 320, stage 335, and stage 340. In other implementations, additional modules nonessential to preserving telephony can be powered down.

At stage 320, the broadband device processor powers down the RF circuitry. The RF circuitry (e.g., Tuner 210 and/or TX 220 of FIG. 2) power down can occur at the broadband device (e.g., broadband device 110 of FIG. 1). In some implementations, the broadband device processor can power down all channels except an essential channel used for telephone calls and/or high priority communication with the terminating system. In other implementations, the terminating system can remotely power down the RF circuitry. In some implementations, RF downstream circuitry for the tuner corresponding to the primary downstream channel remains powered to provide, for example, a mechanism for maintaining telephone service. Depending on the architecture of the broadband device, the broadband device can power down all the tuners and corresponding demodulators except for the turner and demodulator corresponding to the primary downstream channel. Accordingly, to maintain telephone service, all voice packets are carried on the primary downstream channel. In some implementations, power-down of the RF downstream circuitry can be delayed until all telephony lines are idle. In other implementations, the RF downstream circuitry for one or more tuners can remain powered while other tuners are powered down. In still further implementations, a portion of the MAC core can be powered down to conserve battery life.

At stage 325, the broadband device processor sends a configuration status message to the terminating system. The broadband device (e.g., broadband device 110 of FIG. 1) processor can send the configuration status message to the terminating system (e.g., terminating system 130 of FIG. 1) via the network (e.g., network 120 of FIG. 1 and FIG. 2). When the broadband device powers down some of the RF downstream circuitry, the broadband device can lose QAM or FEC lock on the corresponding downstream channels. In some implementations, the configuration status message is sent to the terminating system to inform which channels have been powered down. In other implementations, the terminating system remotely powers down the RF channels and thus a status message is not required. In still further implementations, the broadband device 110 sends a status message to the terminating system 130 indicating that the broadband device 110 has loss QAM or FEC lock on identified downstream channels.

At stage 330, the terminating system ceases transmission over secondary downstream channels. Once notified by the configuration status message, the terminating system (e.g., terminating system 130 of FIG. 1) ceases transmission over secondary downstream channels. In some implementations, data traffic on the secondary downstream channels ceases in response to the loss of lock status message. In other implementations, the transmissions can continue but be ignored by the broadband device. It should be understood that secondary downstream module can include those modules that are not used to place phone calls with the broadband device. The process can end at stage 345.

At stage 335, the broadband device processor powers down the network processor. The power down of the network processor (e.g., network processor 240 of FIG. 2) can occur by the broadband device (e.g., broadband device 110 of FIG. 1) module processor inside, for example, the MAC core (e.g., MAC core 230 of FIG. 2). In some implementations, the broadband device can power down another auxiliary processor. In other implementations, a portion of the MAC core can be powered down to conserve battery life. It should be understood that the broadband device can make additional modifications to the device to accommodate power down on the network processor or portions of the MAC core. The process can end at stage 345.

At stage 340, the broadband device processor powers down the LAN interfaces. The powering down of the LAN interfaces (e.g., LAN interfaces 260 of FIG. 2) can occur by the broadband device (e.g., broadband device 110 of FIG. 1) module processor inside, for example, the MAC core (e.g., MAC core 230 of FIG. 2) or the network processor (e.g., network processor 240 of FIG. 2). In some implementations, the broadband device can power down some or all of the LAN interfaces. In other implementations, the terminating system can remotely power down the LAN interfaces. In alternative implementations, the broadband device 110 may power down a subset of its LAN interfaces based on defined criteria (e.g., LAN power-down rules). The process can end at stage 345.

In some implementations, the broadband device 110 can completely disconnect from the terminating system 130 during the power save mode. In such implementations, the broadband device 110 would re-register (e.g., repeat the initialization process) to ensure that all channels are operational when A/C power is restored.

When A/C power is restored, the broadband device 110 can power up all circuitry and regain synchronization on the remaining downstream channels. The broadband device 110 can then send a status message to the terminating system 130 that the broadband device 110 has regained synchronization on the downstream channels (or a subset thereof). The terminating system can thereafter resume sending traffic on those downstream channels. The broadband device 110 can also resume transmission on upstream channels. In other implementations, the broadband device 110 can select a subset of the previously used upstream channels on which to resume transmission.

Figure 4:
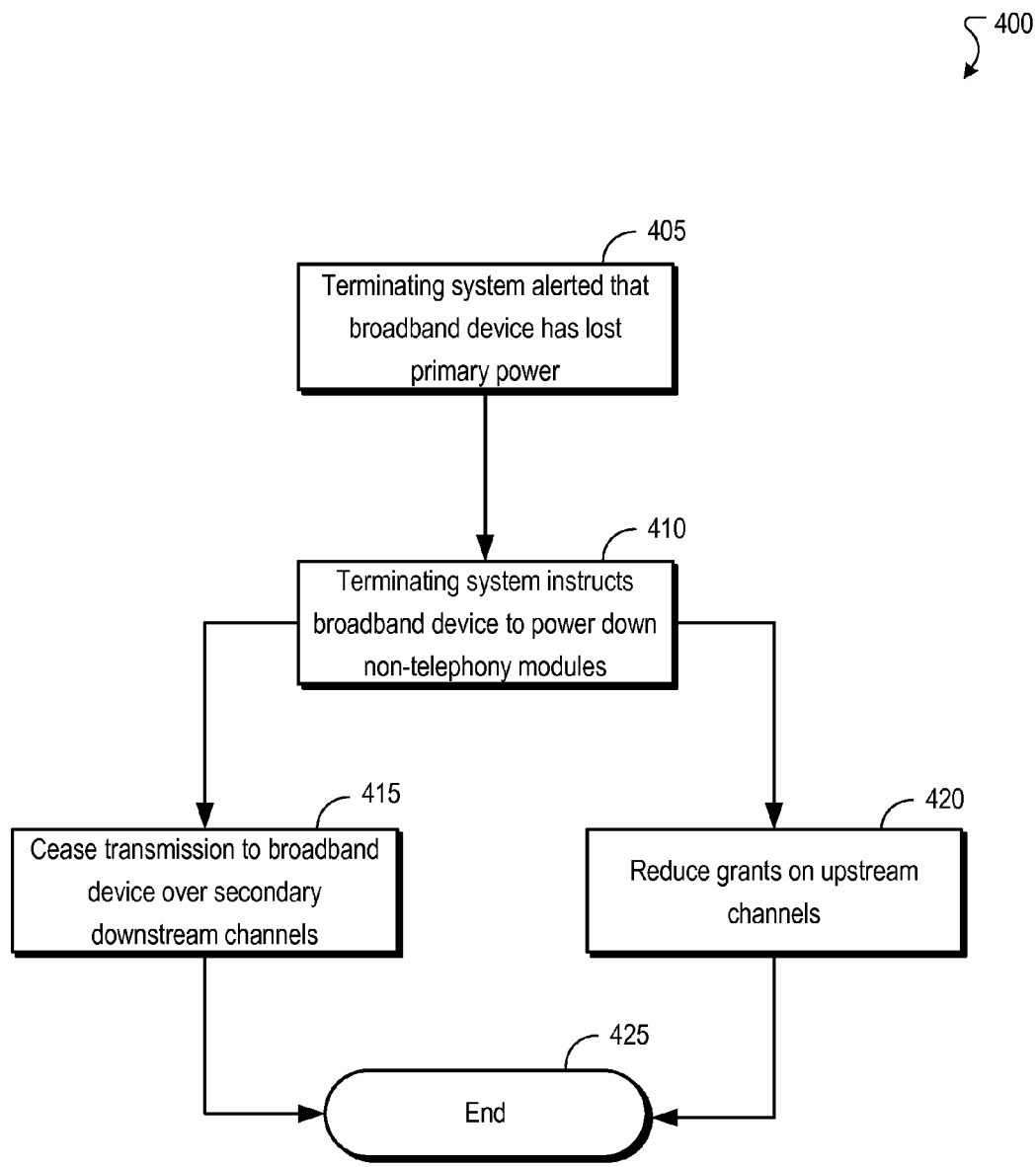
FIG. 4 is a flowchart illustrating an example terminating system process operable to provide power saving for internet-telephony broadband devices using module power down.

FIG. 4 is a flowchart illustrating an example terminating system process operable to provide power saving for internet-telephony broadband devices using module power down. The process begins at stage 405, when the terminating system is alerted that the broadband device has lost primary power. The alert can arrive as a message from the broadband device (e.g., broadband device 110 of FIG. 1) or active monitoring by the terminating system (e.g., terminating system 130 of FIG. 1). In some implementations, a status message is sent from the broadband device to the terminating system. In other implementations, the terminating system is actively monitoring status of the broadband device. In still further implementations, an explicit alert status message to the terminating system is not required. It should be understood that module can include those modules that are not used to place phone calls with the broadband device.

At stage 410, the terminating system instructs the broadband device to power down modules. The instruction can be transmitted from the terminating system (e.g., terminating system 130 of FIG. 1) to the broadband device (e.g., broadband device 110 of FIG. 1) via the network (e.g., network 120 of FIG. 1). In alternative implementations, the broadband device independently powers down modules. The module power down can include one or both of the processes at stage 415 and stage 420. It should be understood that module can include those modules that are not used to place phone calls with the broadband device.

At stage 415, the terminating system can cease transmission to the broadband device over the secondary downstream channels. The cease of transmission can occur at the terminating system (e.g., terminating system 130 of FIG. 1) and can be coordinated in conjunction with messages received from the broadband device (e.g., broadband device 110 of FIG. 1). In some implementations, data traffic on the secondary downstream channels ceases in response to the loss of lock status message. In other implementations, the transmissions can continue but can be ignored by the broadband device. The process can end at stage 425.

At stage 420, the terminating system can reduce grants to the broadband device on upstream channels. The broadband device (e.g., broadband device 110 of FIG. 1) upstream channel grants can be reduced, for example, by a terminating system (e.g., terminating system 130 of FIG. 1). In some implementations, when the broadband device 110 powers down one or more of the transmitters, the terminating system 130 can independently detect that the broadband device 110 is no longer transmitting on the corresponding upstream channels. Thus, the terminating system can reduce grants on these upstream channels while continuing to provide station maintenance intervals. The process can end at stage 425.

Figure 5:
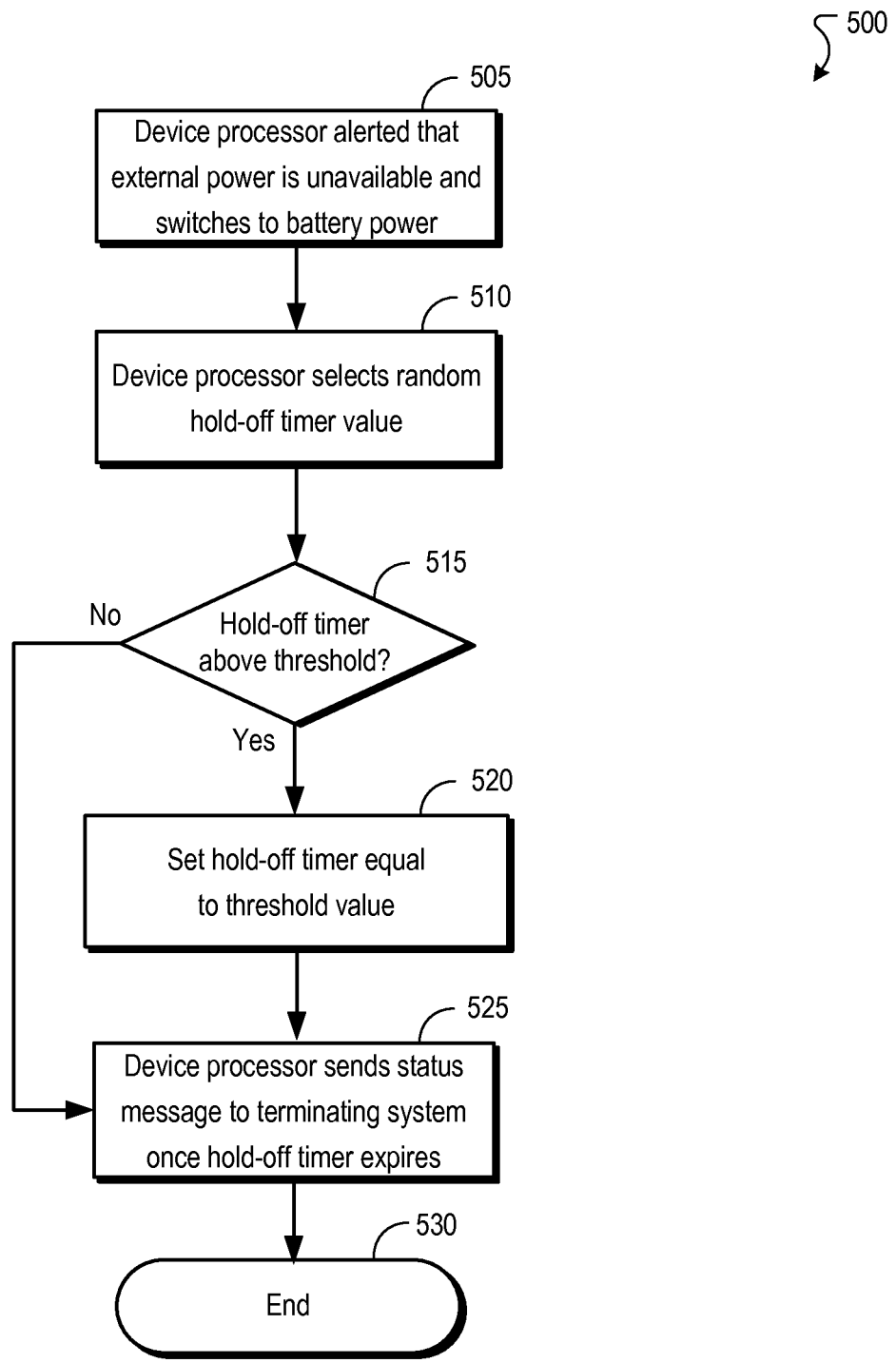
FIG. 5 is a flowchart illustrating an example broadband device process operable to provide power saving for internet-telephony broadband devices using status messages to limit communication with the terminating system.

FIG. 5 is a flowchart illustrating an example broadband device process operable to provide power saving for internet-telephony broadband devices using status messages to limit communication with the terminating system. The process begins at stage 505, when the broadband device processor is alerted that external power is unavailable and switches to backup battery power. The alert can be made by the broadband device (e.g., broadband device 110 of FIG. 1) module processor inside, for example, the MAC core (e.g., MAC core 230 of FIG. 2). In other implementations, the alert can be a processor interrupt.

At stage 510, the broadband device processor selects a random hold-off timer value. The threshold hold-off timer value can be generated, for example, by the broadband device processor (e.g., MAC core 230 or network processor 240 of FIG. 2). In alternative implementations, the terminating system (e.g., terminating system 130 of FIG. 1) generates and transmits the hold-off timer value. In some implementations, the hold-off timer can be contained in a register and set by another device.

At stage 515, a determination is made whether the generated hold-off timer value is above the threshold value. The determination can be made by the broadband device (e.g., broadband device 110 of FIG. 1). In other implementations, the determination can be made remotely by the terminating system (e.g., terminating system 130 of FIG. 1). It should be understood that the determination is not required for the broadband device to set the threshold hold-off value.

If the hold-off timer is above the threshold value, then the broadband device sets the hold-off timer to a threshold value at stage 520. The hold-off timer set can be performed by the broadband device (e.g., broadband device 110 of FIG. 1) and/or the terminating system (e.g., terminating system 130 of FIG. 1). In other implementations, the broadband device can adjust the threshold hold-off timer value to any value less than or equal to the threshold value.

If the hold-off timer is not above the threshold value, then the broadband device processor waits until the hold-off timer expires and sends the status message to the terminating system at stage 525. The waiting can occur within the broadband device e.g., broadband device 110 of FIG. 1). In other implementations, the broadband device (e.g., broadband device 110 of FIG. 1) can adjust the threshold hold-off timer value to any value less than or equal to the threshold value even though the hold-off timer is not above the threshold value.

At stage 525, the broadband device processor waits until the hold-off timer expires and sends the status message to the terminating system. The broadband device (e.g., broadband device 110 of FIG. 1) can send the status message to the terminating system (e.g., terminating system 130 of FIG. 1). In other implementations, the terminating system is actively monitoring status of the broadband device. The process 500 can end at stage 530.

It should be understood that, in addition to data over cable services, the processes described are also applicable other types of networks such as, for example, digital subscriber lines (xDSL), public switched telephone networks, integrated service digital network (ISDN), or T1 connections from telecommunications operators or internet service providers, satellite from satellite operators, or wireless services (such as, e.g., cellular, 802.11 or Wi-MAX standards) from wireless service providers, among many others.

Figure 6:
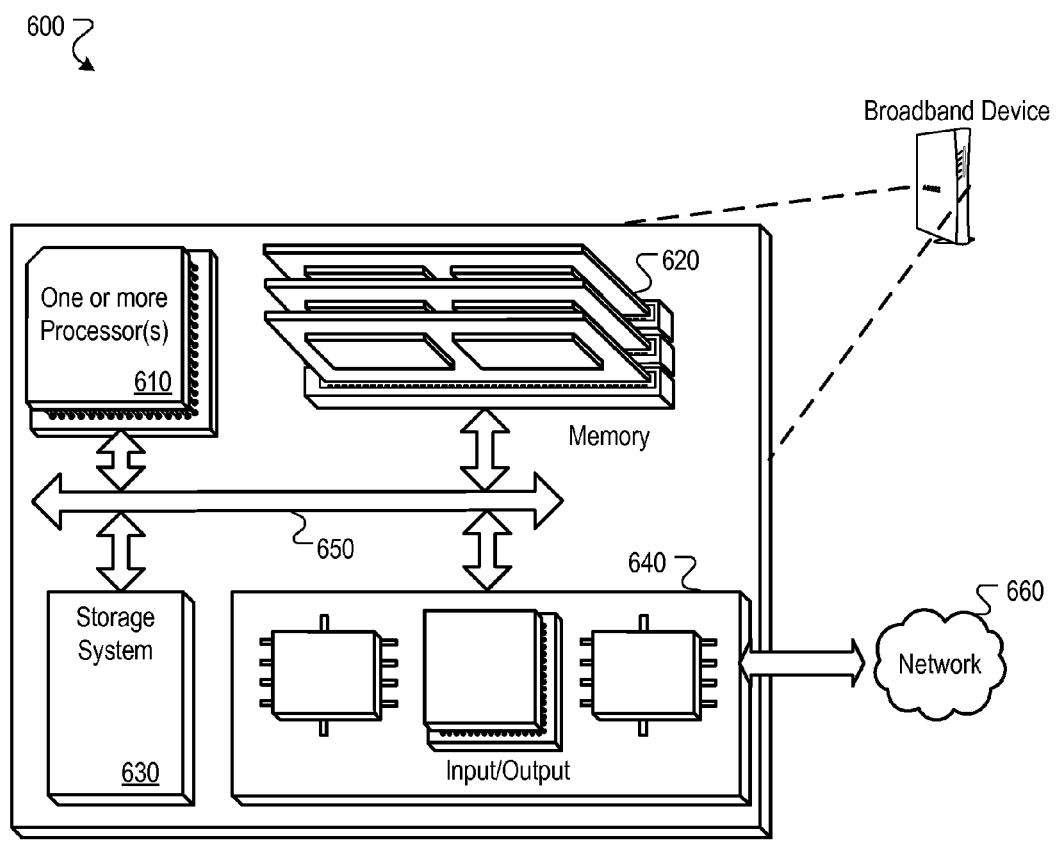
FIG. 6 is a block diagram of a broadband device operable to provide power saving for internet-telephony broadband devices.

FIG. 6 is a block diagram of a broadband device operable to provide power saving for internet-telephony broadband devices. The broadband device 600 can include one or more processor(s) 610, a memory 620, a storage device 630, and an input/output device 640. Each of the modules 610, 620, 630, and 640 can, for example, be interconnected using a system bus 650. The processor(s) 610 is capable of processing instructions for execution within the system 600. In one implementation, the processor(s) 610 is a single-threaded processor(s). In another implementation, the processor(s) 610 is a multi-threaded processor(s). The processor(s) 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the device 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the device 600. In one implementation, the input/output device 640 can include one or more of a wireless interface, network interface 660, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The broadband device (e.g., a modem) of this disclosure, and modules thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor(s)" encompasses all apparatus, devices, and machines for processing data, including by way of example a programmable processor(s), a computer, or multiple processors or computers. The system processor(s) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, processor(s) will receive instructions and data from a read only memory or a random access memory or both. The components of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor(s) and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A power saving internet-telephony broadband device, comprising:
   a network interface operable to receive an incoming and send an outgoing signal;
   a power source operable to use a connected external power supply or a backup battery; and
   a processor module operable to detect when the connected external power supply is interrupted and subsequently switch to the backup battery, the processor being further operable to power down one or more device modules to conserve battery life, wherein the one or more device modules comprises a selected portion of radio frequency circuitry.

2. The power saving internet-telephony broadband device of claim 1, wherein the processor module is operable to send one or more configuration messages to a terminating system.

3. The power saving internet-telephony broadband device of claim 1, wherein the processor is operable to power down a downstream channel module.

4. The power saving internet-telephony broadband device of claim 3, wherein the downstream channel module includes a radio-frequency tuner.

5. The power saving internet-telephony broadband device of claim 3, wherein the downstream channel module includes a demodulator.

6. The power saving internet-telephony broadband device of claim 1, wherein the device module comprises a network processor.

7. The power saving internet-telephony broadband device of claim 1, wherein the processor module is operable to maintain power to radio frequency circuitry assigned to receive a primary downstream channel while powering down all other downstream radio frequency circuitry.

8. The power saving internet-telephony broadband device of claim 1, wherein the device module comprises a local area network interface.

9. The power saving internet-telephony broadband device of claim 1, wherein the device module comprises a portion of the processor module.

10. The power saving internet-telephony broadband device of claim 1, wherein the processor can ignore grants to one or more upstream channels from a terminating system.

11. A computer implemented method comprising:
    receiving a primary power loss alert;
    switching to backup battery via a processor;
    powering down one or more modules via a processor, wherein the one or more modules comprises a selected portion of radio frequency circuitry; and
    resuming normal operation once external power supply has been restored.

12. The computer implemented method of claim 11, further comprising communicating with a terminating system via a network interface to reduce data transmission channels sourced from a broadband device.

13. The computer implemented method of claim 11, further comprising communicating with a terminating system via a network interface to reduce data transmission channels destined for a broadband device.

14. The computer implemented method of claim 11, wherein the module is a network processor.

15. The computer implemented method of claim 11, wherein the portion of radio frequency circuitry comprises one or more radio-frequency tuners.

16. The computer implemented method of claim 11, wherein the module is a local area network interface.

17. The computer implemented method of claim 11, wherein the module is a portion of the processor module.

18. A computer implemented method, comprising:
    receiving a primary power loss alert, the power loss alert indicating loss of an external power supply;
    switching to backup battery via a processor;
    generating a hold-off timer value via a processor;
    comparing the hold-off timer value to a threshold value via a processor;
    reducing the hold-off timer value to the threshold value to minimize data transmission with external devices via a processor; and
    resuming normal operation once the external power supply has been restored.

19. The computer implemented method of claim 18, wherein minimizing the data transmission comprises reducing the hold-off timer to a value lower than the threshold value via a processor.

20. The computer implemented method of claim 18, wherein minimizing data transmission comprises ignoring network responses via a processor.

21. A power saving internet-telephony broadband device, comprising:
    a network interface operable to receive an incoming and send an outgoing signal;
    a power source operable to use a connected external power supply or a backup battery; and
    a processor module operable to detect when the connected external power supply is interrupted and subsequently switch to the backup battery, the processor being further operable to power down one or more device modules to conserve battery life, wherein the processor is operable to power down a downstream channel module comprising a radio frequency tuner.

22. A computer implemented method comprising:
    identifying a primary power loss;
    switching to backup battery via a processor;
    powering down one or more modules via a processor, wherein the powered down one or more modules are selected from the group comprising:
    a selected portion of radio frequency circuitry;
    a selected portion of demodulation circuitry;
    a network processor or auxiliary processor;
    one or more local area network interfaces; and
    resuming normal operation once primary power has been restored.

* * * * *